(12) United States Patent
Nakano et al.

(10) Patent No.: US 6,601,556 B2
(45) Date of Patent: Aug. 5, 2003

(54) NOISE INSULATION STRUCTURE OF SYNTHETIC RESIN MADE CHAMBER

(75) Inventors: Hisako Nakano, Tokyo (JP); Tatsuo Iino, Tokyo (JP); Mamoru Fukushima, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/923,906

(22) Filed: Aug. 6, 2001

(65) Prior Publication Data
US 2002/0020383 A1 Feb. 21, 2002

(30) Foreign Application Priority Data
Aug. 9, 2000 (JP) ........................................ 2000-240618

(51) Int. Cl.[7] .............................................. F02M 35/10
(52) U.S. Cl. .................. 123/184.61; 181/204
(58) Field of Search ..................... 123/184.61; 181/204

(56) References Cited
U.S. PATENT DOCUMENTS
3,845,839 A * 11/1974 Eriksson ....................... 440/52

FOREIGN PATENT DOCUMENTS
JP 402181063 A * 7/1990 ............ 123/184.61

\* cited by examiner

Primary Examiner—Tony M. Argenbright
Assistant Examiner—Katrina B. Harris
(74) Attorney, Agent, or Firm—Martin A. Farber

(57) ABSTRACT

A noise insulation structure of a synthetic resin made conduit includes a synthetic resin made chamber and a rubber made noise insulation member. Since the chamber is closely covered around with the noise insulation member through projections and grooves formed on the contact surface of the chamber with the noise insulation member. Further, cylindrical blind-end bores are provided on the inner surface of the noise insulation member so as to form air columns when the noise insulation member is installed on the chamber. The air columns serve as resonators to muffle noise.

13 Claims, 5 Drawing Sheets

FIG. 5
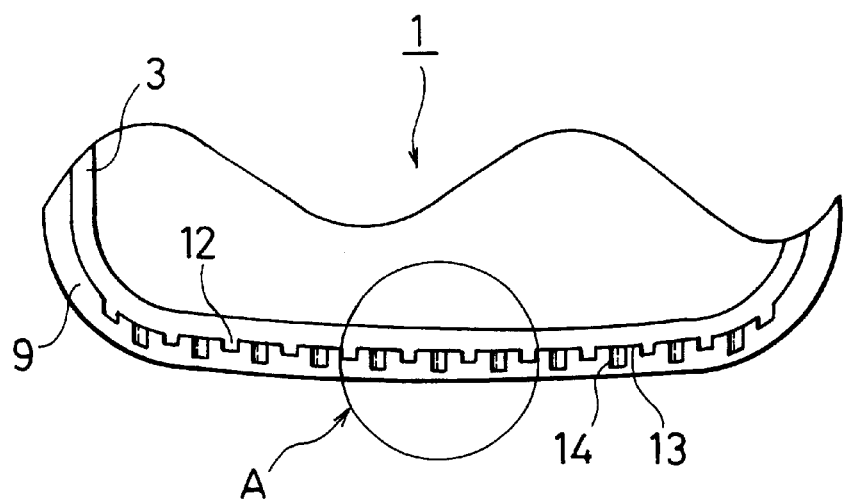
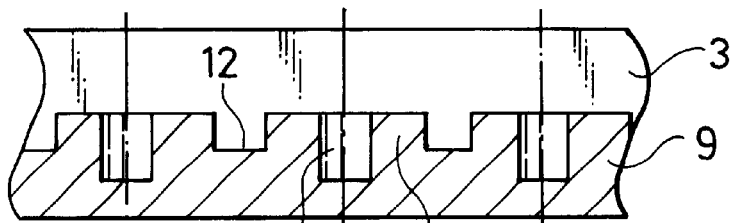
FIG. 6a
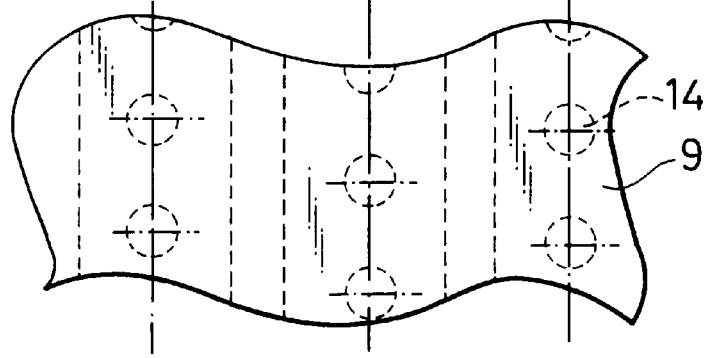
FIG. 6b

NOISE INSULATION STRUCTURE OF
SYNTHETIC RESIN MADE CHAMBER

BACKGROUND OF THE INVENTION

1. Field of the Invention

The present invention relates to a synthetic resin made chamber of a conduit system for an internal combustion engine and more particularly to a noise insulation structure of the synthetic resin made chamber including an intake manifold and an intake chamber.

2. Discussion of Prior Art

In recent years, intake manifolds made of synthetic resin attract an interest in view of weight reduction, cost reduction and recycleability of automobile components. However, synthetic resin intake manifolds have a defect that noise is penetrable because of light weight. In order to effectively insulate and eliminate a noise propagated from air stream in the intake manifold (hereinafter, referred to as intake noise), the synthetic resin intake manifolds are inferior to aluminum alloy made intake manifolds.

The synthetic resin intake manifold with a larger wall thickness has a greater effect of noise insulation but has a disadvantage in productivity due to more elongated time for curing resin, therefore there is a limit in increasing the wall thickness of the synthetic resin intake manifold.

This problem is not limited to synthetic resin intake manifolds and also occurs in fabricating miscellaneous synthetic resin chambers including synthetic resin intake chambers.

SUMMARY OF THE INVENTION

It is an object of the present invention to provide a synthetic resin chamber having a high noise insulation ability and capable of being manufactured at low cost.

In order to achieve the object, a noise insulation structure of a conduit system of an internal combustion engine comprises a synthetic resin made chamber and a noise insulation member installed on the chamber in such a manner as covering the chamber. Specifically, the synthetic resin made chamber has a plurality of ribs and a plurality of first grooves formed between two adjacent ribs on the outer surface thereof, the noise insulation member has a plurality of projections extending along the ribs and a plurality of second grooves formed between two adjacent projections, the ribs fit to the second grooves and the projections fit to the first grooves so that the chamber has a close contact with the noise insulation member.

Further, the projection has a plurality of cylindrical blind-end bores provided along an extending direction of the projection on a top portion of the projection. These cylindrical blind-end bores make air columns when the chamber is covered with the noise insulation member and the air columns serves as muffling noise due to the resonance effect.

BRIEF DESCRIPTION OF THE DRAWINGS

FIG. 5 is a sectional view taken along a line B—B of FIG. 1;

FIGS. 6a and 6b are enlarged views of fitting portions; and

DESCRIPTION OF THE PREFERRED EMBODIMENTS

Figure 1:
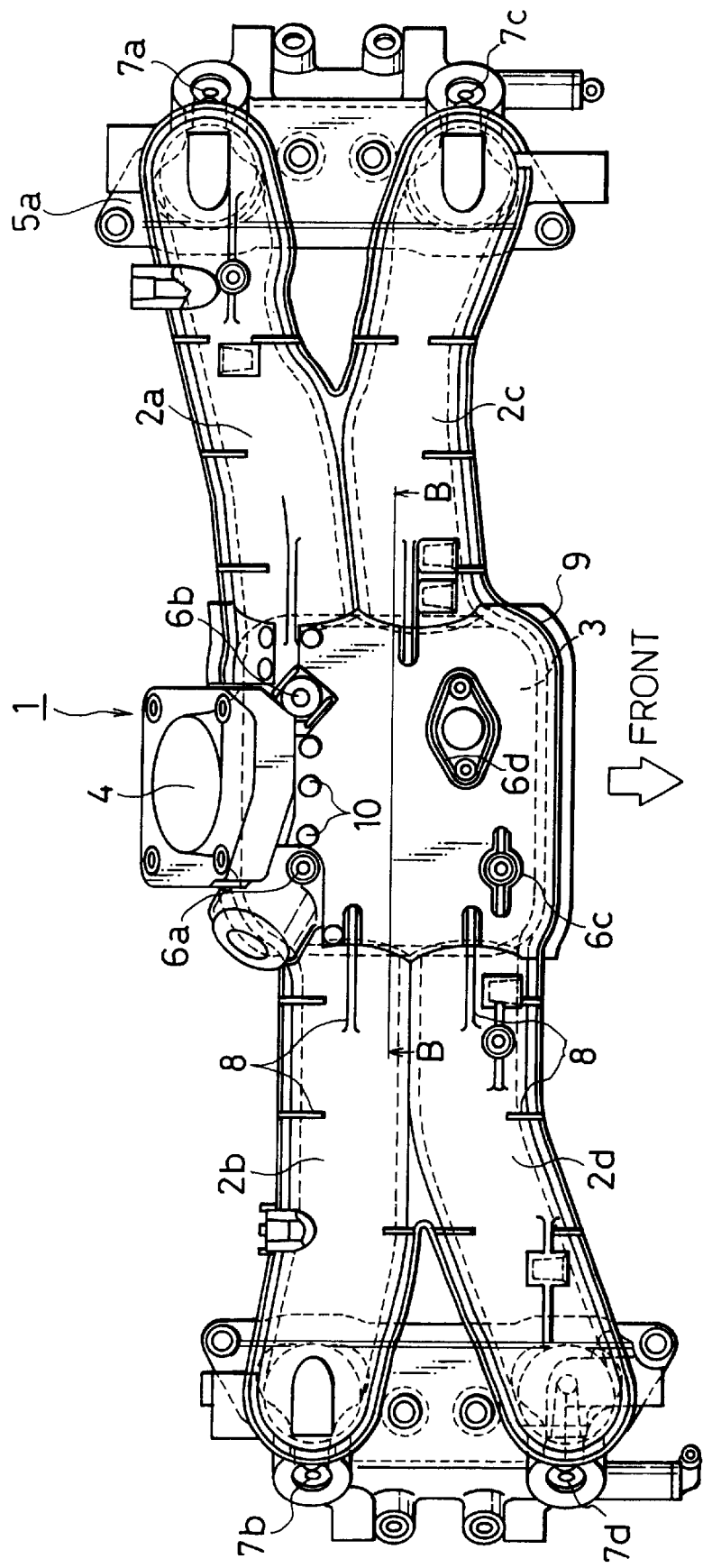
FIG. 1 is atop view of a synthetic resin intake manifold according to the present invention.
Figure 2:
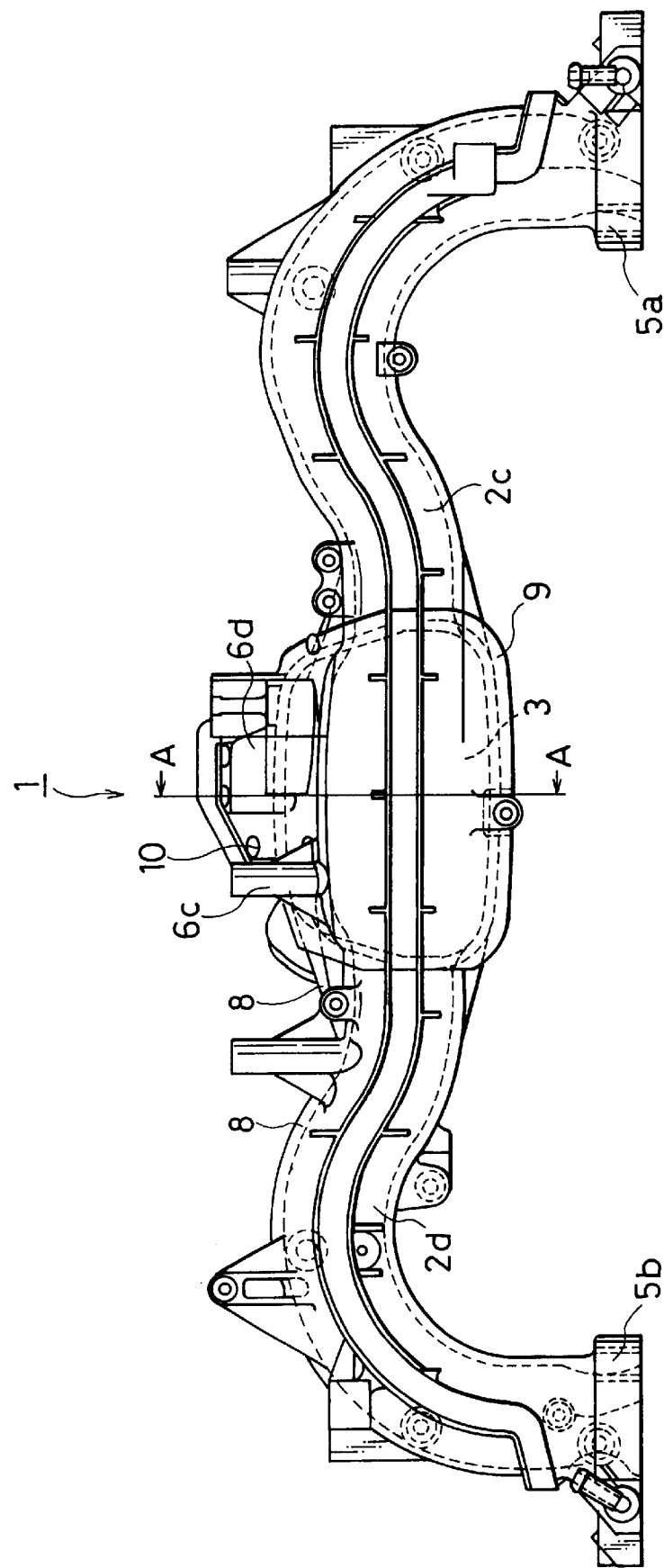
FIG. 2 is a front view of a synthetic resin intake manifold according to the present invention.

Referring now to FIGS. 1 and 2, reference numeral 1 denotes an intake manifold made of synthetic resin for a horizontally opposed four cylinders engine. Intake passages 2a, 2b, 2c and 2d and a chamber section 3 are integrally formed with the intake manifold 1. The chamber section 3 has an air intake inlet 4 for introducing air through a throttle valve (not shown) on the rear side thereof. Intake passages 2a and 2c extend from one side of the chamber section 3 to supply air to two cylinders on the left bank side and intake passages 2b and 2d extend from the other side of the chamber section 3 to supply air to two cylinders on the right bank side. The adjacent paired intake passages 2a and 2c (or 2b and 2d) gradually go apart from each other as they extend toward the left (or right) bank of the engine. There is provided a flange section 5a at the left end of the paired intake passages 2a, 2c and there is a provided a flange section 5b at the right end of the paired intake passages 2b, 2d. Further, there is provided each opening of the intake passages 2a, 2c on the under surface of the flange section 5a and there is provided each opening of the intake passages 2b, 2d on the under surface of the flange section 5b. The intake manifold 1 is mounted on a cylinder head (not shown) of the engine. Air introduced from the air intake inlet 4 to the chamber section 3 is guided to respective intake ports of the cylinder head through the bifurcated intake passages 2a, 2b, 2c and 2d.

Installation sections 6a, 6b, 6c and 6d on which sensors, wires, pipes and the like are installed are formed integrally with the chamber section 3 in such a manner as projecting from the exterior surface of the chamber section 3. Further, there are provided injector installation sections 7a, 7b, 7c and 7d in the vicinity of the flange sections 5a, 5b. When fuel injectors (not shown) are mounted on the injector installation sections 7a, 7b, 7c and 7d, fuel injection nozzles of the fuel injectors is opposite to the intake passages 2a, 2b, 2c and 2d so as to inject fuel towards the intake ports of the engine. Further, a plurality of ribs 8 is integrally formed with the intake manifold 1 in such a manner as projecting from the exterior surface of the intake manifold 1. These ribs 8 are disposed in appropriate positions of the exterior surface of the intake manifold 1, such as the outer wall of the intake passages 2a, 2b, 2c and 2d, the connecting portion of the intake passages 2a, 2b, 2c and 2d with the chamber 3 and others. These ribs 8 serves as enhancing the strength of the intake manifold 1 and damping vibrations so as to raise the noise insulation performance of the intake manifold 1 itself.

The chamber section 3 is closely covered around with a noise insulation member 9. The noise insulation member 9 is made of rubber sheet molded on the configuration of the chamber section 3. In this embodiment, the noise insulation member 9 has a thickness of 6 millimeters and is made of ethylene propylene rubber (EPDM), synthetic rubber which is inexpensive and durable, or made of butyl rubber which is thermoplastic elastic body. Further, the noise insulation member 9 has relief holes for avoiding the ribs 8 and installation sections 6a, 6b, 6c and 6d.

A plurality of protrusions 10 are integrally molded on the exterior surface of the chamber section 3. The noise insulation member 9 is secured to the chamber section 3 by deforming a top section of the protrusions 10 by applying heat thereto. The protrusions 10a and 10b are shaped such that the top sections of the protrusions 10a and 10b are projected from the exterior surface of the noise insulation member 9 when the noise insulation member 9 is fitted to the chamber section 3. On the other hand, the noise insulation member 9 has through holes 11a and 11b for allowing the protrusions 10a and 10b to pass through the interior and exterior surfaces of the noise insulation member 9 in a right position corresponding to the protrusions 10a and 10b, respectively.

Figure 3:
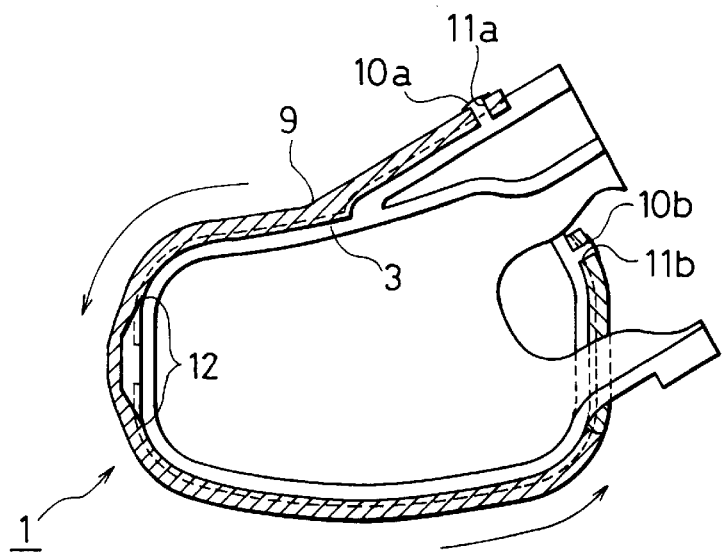
FIG. 3 is a sectional view taken along a line A—A of FIG. 2.
Figure 4A:
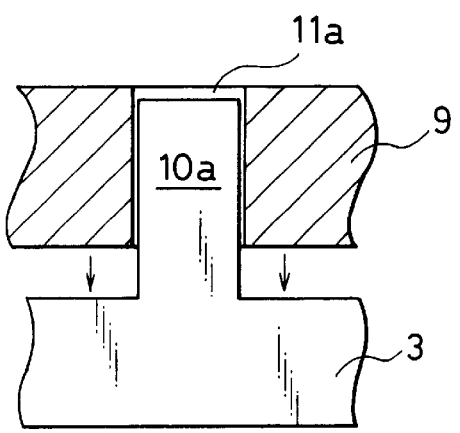
FIGS. 4a and 4b are explanatory views showing how to mount a noise insulation member.
Figure 4B:
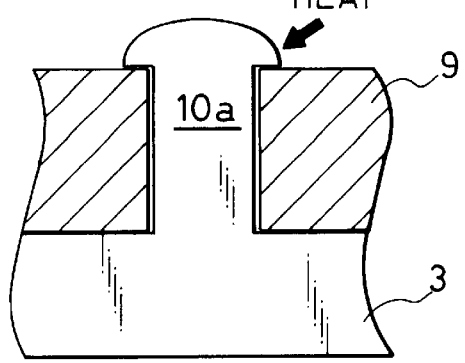

When the noise insulation member 9 is installed, first the through hole 11a of the noise insulation member 9 is fitted over the protrusion 10a of the chamber section 3 to locate the noise insulation member 9 in a proper position, as shown in FIG. 4a. Then, the top section of the protrusion 10a is heated to be deformed (heat caulking). Thus, one side of the noise insulation member 9 is secured to the chamber section 3 (see FIG. 4b). Then, the noise insulation member 9 is closely fitted on the chamber section 3 in an arrow direction of FIG. 3. The tight fitting of the noise insulation member 9 on the chamber section 3 is accomplished by inlaying convex portions formed on the surface of the chamber section 3 into concave portions formed on the surface of the noise insulation member 9 or vise versa. Then, the protrusion 10b passes through the through hole 11b and the chamber section 3 is covered around with the noise insulation member 9. Finally, the aforesaid heat caulking is applied to the protrusion 10b. Thus, the noise insulation member 9 can be secured to the chamber section 3 with a relatively easy work.

Referring to FIG. 5, a plurality of engagement ribs 12 are integrally formed on the exterior surface of the chamber section 3 in order to secure strength of the chamber section 3 and tightness of the noise insulation member 9. These engagement ribs 12 have a specified height, for example, 2 millimeters high, are arranged at a specified interval and each of the engagement ribs 12 extend straight along the configuration of the chamber section 3. Further, a plurality of engagement projections 13 having approximately the same height as the engagement ribs 12 are formed on the contact surface with the chamber section 3 of the noise insulation member 9. The engagement projections 13 have approximately the same width as a groove formed between two adjacent engagement ribs 12, 12 and extend straight in an extending direction of the engagement ribs 12. The engagement projections 13 are fitted to the groove formed between two adjacent engagement ribs 12, 12. Further, the engagement ribs 12 are fitted to a groove formed between two adjacent engagement projections 13, 13. Thus, in addition to the heat caulking applied, since the projections and grooves formed on the both surfaces of the chamber section 3 and noise insulation member 9 are fitted to or over each other, the noise insulation member 9 is secured to the chamber section 3.

Referring to FIGS. 6a and 6b, cylindrical blind-end bores 14 are formed along a straight line on the top surface of the engagement projections 13. When the engagement ribs 12 and the engagement projections 13 are fitted to the grooves respectively, air is sealed in the cylindrical blind-end bores 14 and an air column is formed. The air column has a resonance effect, in which a noise having a specific frequency is suppressed or muffled according to the diameter or length of the air column. The diameter and the length of the cylindrical bores 14 are properly established in consideration of frequency of the intake noise to be muffled. The cylindrical bores 14 are not limited to have a cylindrical configuration but may have an appropriate configuration including polygonal pole.

In this embodiment, the chamber section 3 which is a primary source of intake noise is covered around with the noise insulation member 9 having an excellent noise insulation effect. Particularly, since the engagement ribs 12 integrally formed with the chamber section 3 are engaged with the engagement projections 13 integrally formed with the noise insulation member 9, the noise insulation member 9 can have a close contact with the chamber section 3. As a result, the chamber section 3 is furnished with an excellent damping effect against noise. Further, since air is sealed in the cylindrical blind-end bores 14 formed on the top portions of the engagement projections 13, the cylindrical blind-end bores 14 serves as a resonator and as a result the noise insulation performance enhances. Thus, intake noise whose main source is the chamber section 3 can be reduced to almost the same level as an intake manifold made of aluminum alloy.

Further, the location of the noise insulation member 9 can be easily determined by fitting the protrusion 10 of the chamber section 3 to the through hole 11 of the noise insulation member 9. Further, the noise insulation member 9 can be easily secured to the chamber section 3 by heat caulking without using additional equipments for installation. Accordingly, the installation work of the noise insulation member 9 can be accomplished easily and efficiently. Further, since the number of components can be reduced, the manufacturing cost can be reduced.

Figure 7A:
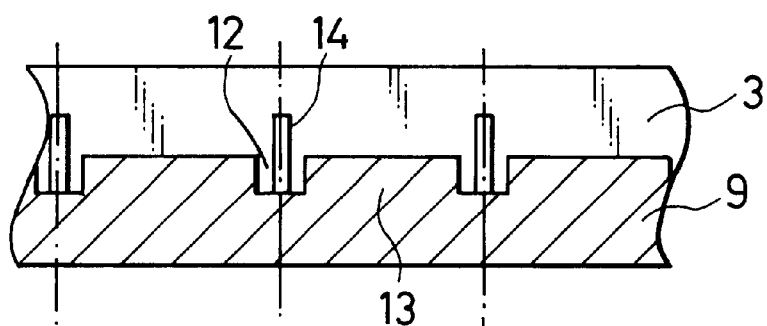
FIGS. 7a and 7b are enlarged views of fitting portions.
Figure 7B:
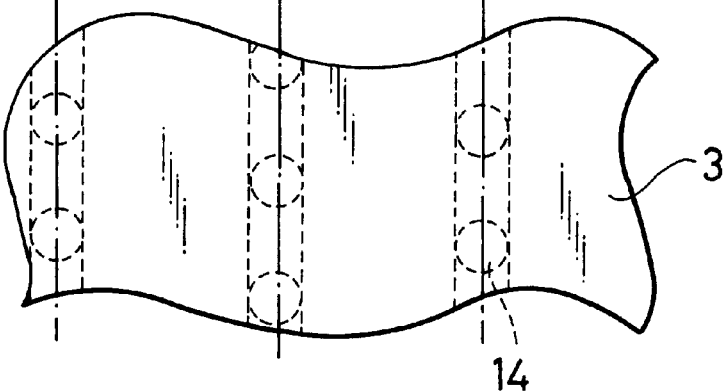

In the aforesaid embodiment, the cylindrical bores 14 are provided on the noise insulation member 9 but these cylindrical bores 14 may be provided on the chamber section 3, as shown in FIGS. 7a and 7b. Further, in the aforesaid embodiment, the chamber section of the intake manifold has been exemplified but the chamber does not belong only to the intake manifold. The chamber structure may be applied to other miscellaneous synthetic resin chambers used in an engine.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A noise insulation structure of a synthetic resin made air intake conduit of an internal combustion engine, comprising:

a synthetic resin made chamber forming a part of said air intake conduit; and a noise insulation member mounted on said chamber in such a manner as covering said chamber.

2. The noise insulation structure according to claim 1, wherein said chamber has a plurality of ribs and a plurality of first grooves formed between said two adjacent ribs on the outer surface thereof, said noise insulation member has a plurality of projections extending along said ribs and a plurality of second grooves formed between said two adjacent projections, said ribs fit to said second grooves and said projections fit to said first grooves so that said chamber has a close contact with said noise insulation member.

3. The noise insulation structure according to claim 2, wherein said projection has a plurality of cylindrical blind-end bores provided along an extending direction of said projection on a top portion of said projection.

4. The noise insulation structure according to claim 2, wherein
said rib has a plurality of cylindrical blind end bores provided along an extending direction of said rib on a top portion of said rib.

5. The noise insulation structure according to claim 1, wherein
said chamber has a plurality of protrusions integrally formed with said chamber, said noise insulation member has a plurality of through holes and said noise insulation member is secured to said chamber by deforming a top portion of said protrusion by heating said top portion after fitting said protrusion to said through hole.

6. The noise insulation structure according to claim 1, wherein
said noise insulation member is made of rubber.

7. The noise insulation structure according to claim 1, wherein
said noise insulation member is made of thermoplastic elastic body.

8. The noise insulation structure according to claim 7, wherein said noise insulation member includes relief holes extending therethrough for avoiding the ribs.

9. The noise insulation structure according to claim 5, wherein top sections of said plurality of protrusions are projected from an exterior surface of said noise insulation member when said noise insulation member is fitted to said chamber.

10. A noise insulation structure of a synthetic resin made conduit, comprising:
a synthetic resin made chamber; and
a noise insulation member installed on said chamber in such a manner as covering said chamber, wherein
said chamber has a plurality of ribs and a plurality of first grooves formed between said two adjacent ribs on the outer surface thereof, said noise insulation member has a plurality of projections extending along said ribs and a plurality of second grooves formed between said two adjacent projections, said ribs fit to said second grooves and said projections fit to said first grooves so that said chamber has a close contact with said noise insulation member.

11. The noise insulation structure according to claim 10, wherein
said projection has a plurality of cylindrical blind-end bores provided along an extending direction of said projection on a top portion of said projection.

12. The noise insulation structure according to claim 10, wherein
said rib has a plurality of cylindrical blind end bores provided along an extending direction of said rib on a top portion of said rib.

13. A noise insulation structure of a synthetic resin made conduit, comprising:
a synthetic resin made chamber; and
a noise insulation member installed on said chamber in such a manner as covering said chamber, wherein
said chamber has a plurality of protrusions integrally formed with said chamber, said noise insulation member has a plurality of through holes and said noise insulation member is secured to said chamber by deforming a top portion of said protrusion by heating said top portion after fitting said protrusion to said through hole.

* * * * *